Patented Aug. 25, 1931

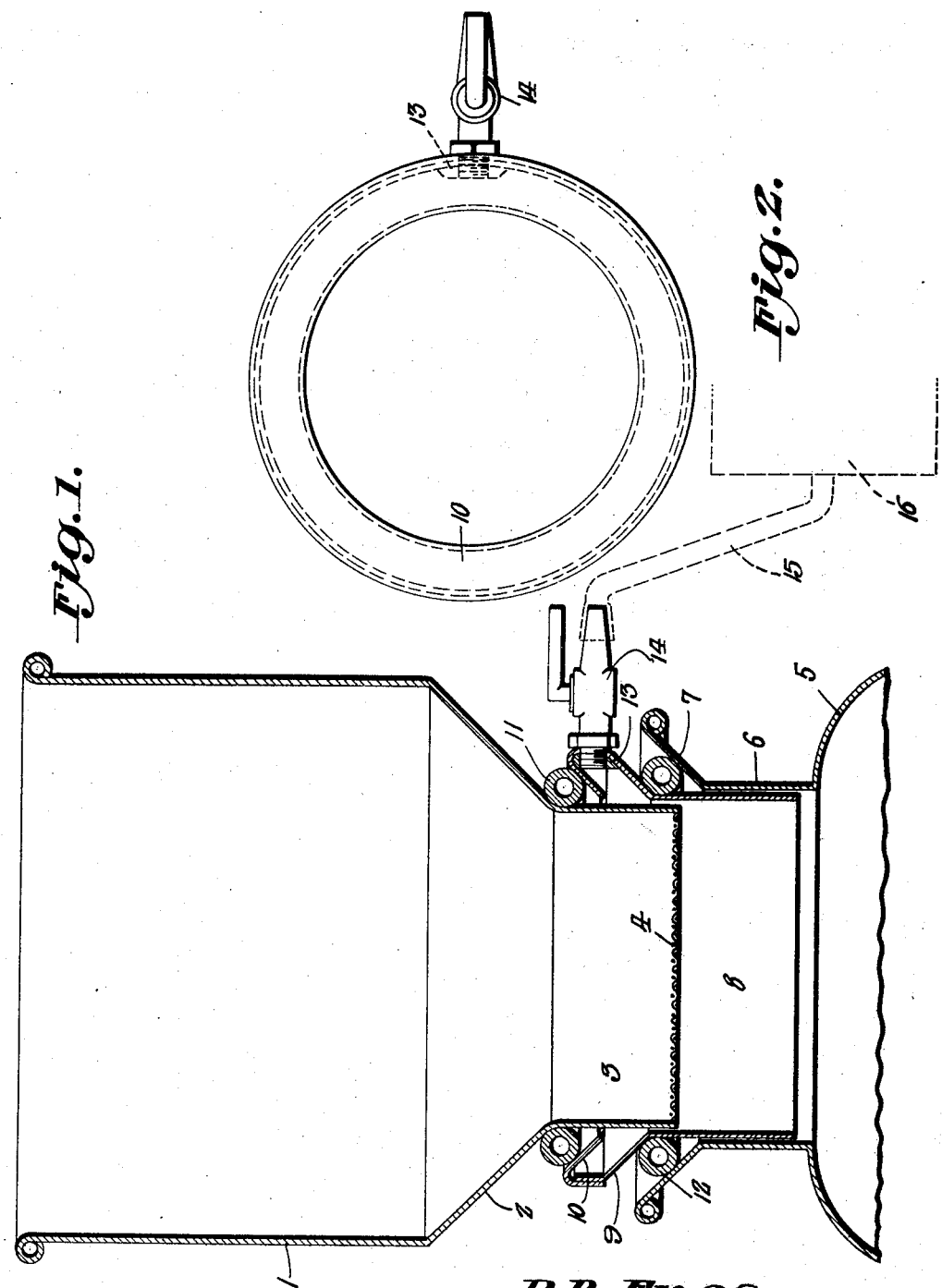

1,820,610

UNITED STATES PATENT OFFICE

PARVIN B. EVES, OF WHITEWATER, WISCONSIN

MILK STRAINER

Application filed September 13, 1929. Serial No. 392,441.

My present invention has reference to a milk filter and my object is to arrange in the mouth of a milk can or like receptacle a funnel-like member that receives therein the spout of the filter, there being means for establishing an air tight joint between these members, and wherein the funnel member is provided with valve controlled means through which air from the can is drawn to rarefy the air in the can or to produce a vacuum in the can so that the preponderance of pressure caused by the milk to be strained will produce a rapid and efficient filtering action.

To the attainment of the foregoing the invention consists in the improvement hereinafter described and definitely claimed.

In the drawings:

Figure 1 is a sectional view illustrating the application of my improvement.

Figure 2 is a top plan view of the improvement per se.

In Figure 1 of the drawings the numeral 1 designates the hopper of a milk strainer. This hopper is provided with the usual inwardly inclined or flared bottom portion 2 that merges into the spout 3 in which there is arranged the filtering discs 4. Normally the strainer is received in the mouth or neck of a can 5 in which the milk is filtered. The can 5 is provided with the usual neck extension 6 that merges into the outwardly flanged mouth 7 and the outer edge of the mouth is beaded in the usual manner.

My improvement is in the nature of a funnel member 8 which is freely received through the mouth and neck of the can 5. The funnel 8 has, adjacent to its outer end, an outwardly inclined or flared portion 9 whose upper edge is rounded and from thence flared inwardly, as at 10. There is arranged between the part 2 of the filtering hopper 1 and the inwardly flared mouth 10 of the funnel a compressible ring gasket 11 and there is likewise arranged between the flared top portion 9 of the funnel and the flared mouth 7 of the can 5 a similar ring gasket 12. As disclosed by the drawings both of the gaskets 11 and 12 are in the nature of hollow rubber rings and when compressed will establish an air tight joint between the hopper, the can and the funnel.

The spaced flared or tapered walls 9 and 10 provide the head or top of the cylindrical body of the funnel 8 with an annular air chamber and the inner wall of this chamber is thickened, as at 13, and through this thickened portion there is screwed the end of a hand operated cock 14. The cock 14 has a tube or pipe connection 15 with a vacuum tank 16, such as is commonly used with milking machines.

After a quantity of milk is delivered into the hopper the cock 14 is opened and air is drawn by the machine 16 from the can so as to rarefy the air in the can or to produce a vacuum therein. The milk in the strainer hopper having no resistance offered thereto by the air in the can will freely pass through the filtering disc 4 and with my improvement the milk is strained in a much faster manner than is ordinary, and likewise with the improvement it is possible to strain the milk through heavier discs and thereby insure much cleaner milk.

Having described the invention, I claim:

In a device for the purpose set forth, a funnel-shaped member having a tubular body and a head that comprises spaced inwardly and outwardly flared walls, the inwardly flared wall providing the mouth of the funnel and the space between the walls affording an annular air chamber and a hand operated cock screwed in said chamber, in combination with compressible rings for establishing an air-tight joint between the funnel and the mouth of a receptacle in which the funnel is received and a similar joint between a receptacle which is directed through the mouth of the funnel.

In testimony whereof I affix my signature.

PARVIN B. EVES.